(12) United States Patent
Campany et al.

(10) Patent No.: US 7,303,481 B2
(45) Date of Patent: Dec. 4, 2007

(54) ELECTRICALLY ISOLATED ACTUATOR OUTPUT SHAFT

(75) Inventors: Andrew D. Campany, Valencia, CA (US); David B. Welch, Santa Clarita, CA (US); Andrew L. Vasquez, Valencia, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/051,531

(22) Filed: Feb. 4, 2005

(65) Prior Publication Data

US 2006/0174956 A1 Aug. 10, 2006

(51) Int. Cl.
*F16D 3/76* (2006.01)

(52) U.S. Cl. .............. 464/89; 464/DIG. 900; 251/129

(58) Field of Classification Search ........... 137/884; 251/86, 304, 129; 464/74, 75, 89, 92, 93, 464/DIG. 900; 123/510; 244/135 R
See application file for complete search history.

(56) References Cited

U.S. PATENT DOCUMENTS

| | | | | |
|---|---|---|---|---|
| 1,220,310 A | * | 3/1917 | Baldwin | 464/155 |
| 1,649,426 A | * | 11/1927 | Van Ranst | 464/75 |
| 2,269,799 A | * | 1/1942 | Upson | 464/89 |
| 2,997,057 A | | 8/1961 | Toth | |
| 3,080,735 A | * | 3/1963 | Blom, Jr. et al. | 464/30 |
| 3,112,625 A | * | 12/1963 | Leto | 464/87 |
| 3,212,290 A | * | 10/1965 | Walden | 464/88 |
| 3,873,863 A | * | 3/1975 | Pew | 310/50 |
| 3,906,308 A | | 9/1975 | Amason et al. | |
| 4,357,137 A | * | 11/1982 | Brown | 464/75 |
| 4,437,487 A | | 3/1984 | Marmon | |
| 4,493,616 A | | 1/1985 | Bergin | |
| 4,878,511 A | | 11/1989 | Fox | |
| 4,880,029 A | | 11/1989 | Koller | |
| 4,891,034 A | * | 1/1990 | Wilhelmsen | 464/87 |
| 4,927,403 A | * | 5/1990 | Pate, Sr. | 464/30 |
| 4,971,268 A | | 11/1990 | Dobrowski et al. | |
| 4,996,016 A | | 2/1991 | Walls et al. | |
| 5,709,356 A | | 1/1998 | Avenet et al. | |
| 5,836,821 A | * | 11/1998 | Yamada et al. | 464/89 |

(Continued)

FOREIGN PATENT DOCUMENTS

EP 0 098 777 A 1/1984

(Continued)

OTHER PUBLICATIONS

Andrew D. Campany, "Design with Elastomers for Dynamic Isolation and Motion Conrol", Rubber World, Dec. 1994, pp. 22-31.

*Primary Examiner*—John Fox
(74) *Attorney, Agent, or Firm*—RatnerPrestia

(57) ABSTRACT

An actuator for use in a fuel system. The actuator has a first metallic section adapted to be coupled to a motor, a second metallic section adapted to be coupled to a valve, and a nonmetallic section coupled to the first and second metallic sections for transmitting torque from the first metallic section to the second metallic section.

31 Claims, 5 Drawing Sheets

U.S. PATENT DOCUMENTS

| | | | |
|---|---|---|---|
| 5,927,682 A * | 7/1999 | Gul et al. .................... | 251/77 |
| 6,072,252 A | 6/2000 | Van Dine et al. | |
| 6,117,017 A * | 9/2000 | Schurhorster ................ | 464/92 |
| 6,141,194 A | 10/2000 | Maier | |
| 6,343,465 B1 | 2/2002 | Martinov | |
| 6,360,619 B1 | 3/2002 | Schultz, Jr. | |
| 6,622,986 B2 | 9/2003 | Gagnon | |
| 6,736,354 B2 | 5/2004 | Goto et al. | |

FOREIGN PATENT DOCUMENTS

| | | |
|---|---|---|
| EP | 0 990 809 A | 4/2000 |
| GB | 848 151 A | 9/1960 |
| GB | 1 490 805 A | 11/1977 |
| WO | WO 02/059515 A | 8/2002 |

* cited by examiner

ELECTRICALLY ISOLATED ACTUATOR OUTPUT SHAFT

TECHNICAL FIELD

This application relates generally to a system for controlling a valve within a fuel tank. More particularly, it relates to an actuator output shaft that substantially isolates electrical voltage from ignitable fuel system vapors.

BACKGROUND OF THE INVENTION

Fuel system valves, located in airplane fuel tanks, allow the transfer of aviation fuel from the tanks to the engines. Fuel tanks may be located in the fuselage, in the wings, and in other locations on the plane. Typically, electrically operated actuator drive shafts are used to drive the fuel system valves in airplanes. These actuator drive shafts are manufactured from electrically conductive metallic materials. The metallic drive shafts allow the possibility, under certain conditions, that electrical current may pass through them and into the fuel tank, resulting in an ignition source.

Various devices to protect airplane fuel tanks against sparking have been developed.

U.S. Pat. No. 4,971,268 issued to Dobrowski et al. is concerned with preventing sparking caused by tubing within a fuel tank. It uses a sleeve having sufficiently high dielectric strength to prevent electrical arcing between the tubing and any immediately adjacent structure.

U.S. Pat. No. 5,709,356 issued to Avenet et al. discloses an anti-spark structure including two elements of composite material. The structure forms part of an aircraft's fuel tank. A metal screw is placed within the two elements of composite material. When lightning reaches the head of the screw, the current passes into the two elements. Gasses created by heating due to the current flow are removed toward the outside of the anti-spark structure through a passage within the screw.

U.S. Pat. No. 6,141,194 issued to Maier discloses an aircraft fuel tank protective barrier which includes a transformer. The transformer limits an amount of energy delivered to the fuel tank in the event of a fault experienced on the wiring. The core saturation of the transformer is utilized to limit the energy transfer to the tank during power fault conditions while the common-mode rejection of the transformer is used to block lightning strikes.

U.S. Pat. No. 6,343,465 issued to Martinov discloses ducting, one end of which is in communication with the aircraft's fuel tank and the other end is coupled to the engine air intake area. The operating engine's intake suction force is used to drive the system of purging and removing dangerous fumes and heat from the fuel tank areas and conducts them into the engine's combustion chamber areas for combustion and exhaust. The removed fumes and heat are replaced by ambient outside air, mechanically refrigerated air or cabin-cockpit overflow air through the tank intake valves.

SUMMARY OF THE INVENTION

The invention pertains to a valve actuator for use in a fuel system. The actuator has a first metallic section adapted to be coupled to a motor, a second metallic section adapted to be coupled to a valve, and a nonmetallic section coupled to the first and second metallic sections for transmitting torque from the first metallic section to the second metallic section.

The invention also pertains to a system for operating a fuel valve disposed within a fuel tank. The system comprises a motor, a fuel valve disposed in a fuel tank, and an actuator assembly coupling the motor to the fuel valve. The actuator assembly includes a first metallic section coupled to the motor, a drive shaft coupled to the fuel valve and a second metallic section coupled to the drive shaft. An electrically insulating section is coupled to the first and second metallic sections for electrically insulating the first and second metallic sections from each other and for transmitting torque from the motor to the drive shaft.

BRIEF DESCRIPTION OF THE DRAWINGS

The invention is best understood from the following detailed description when read in connection with the accompanying drawings. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 2:
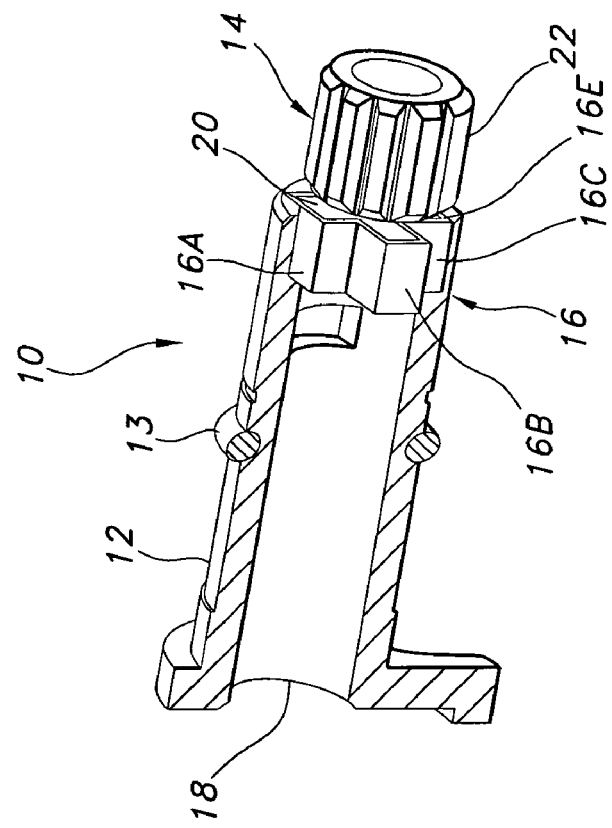
FIG. 2 is a cut-away perspective view of an assembled actuator output shaft according to an exemplary embodiment of the present invention.

Referring now to the drawing, like reference numbers refer to like elements described in the figures.

Figure 1:
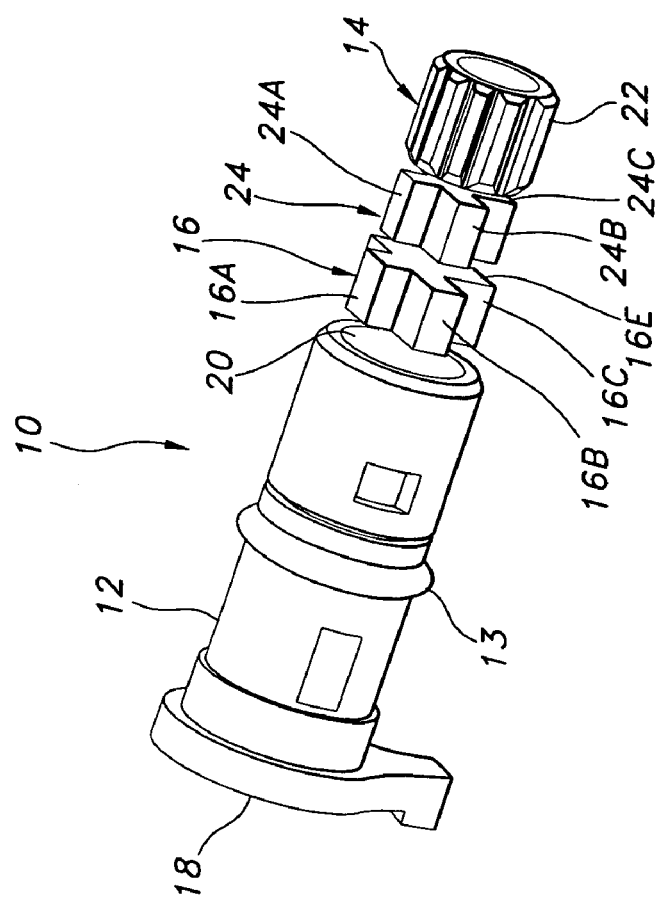
FIG. 1 is an exploded perspective view of an actuator output shaft according to an exemplary embodiment of the present invention.

FIGS. 1 and 2 are perspective views of an actuator output shaft 10 according to an exemplary embodiment of the invention. More specifically, FIG. 1 is an exploded view and FIG. 2 is a cut-away view of actuator output shaft 10. Referring to FIGS. 1 and 2, an exemplary embodiment of a composite actuator output shaft is shown that is divided into three sections. One section of actuator output shaft 10 is a cylindrically shaped first metallic shaft 12. In an exemplary embodiment, first metallic shaft 12 may be approximately 24 mm long and may be made of 416 Corrosion Resistant Steel. In an alternative embodiment, first metallic shaft 12 may be made of 17-4 Precipitation Hardened Steel or any other metal having characteristics of strength and corrosion resistance that are similar to 416 Corrosion Resistant Steel or to 17-4 Precipitation Hardened Steel. Its length may vary depending upon variation of torque requirements and/or what is needed to interface with a customer's equipment.

Another section of actuator output shaft 10 is a cylindrically shaped second metallic shaft 14. In an exemplary embodiment, second metallic shaft 14 may be approximately 17.5 mm long and may be a metal made of 416 Corrosion Resistant Steel. In an alternative embodiment, second metallic shaft 14 may be made of 17-4 Precipitation Hardened Steel or any other metal having similar characteristics to corrosion resistant steel. Its length may vary depending upon variation of torque requirements and/or what is needed to interface with a customer's equipment.

Yet another section of actuator output shaft 10 is a nonmetallic, electrically insulating coupler 16. In an exemplary embodiment, a length of coupler 16 may be 10 mm and may be made of an elastomeric material such as silicone or Ethylene-propylene-diene rubber (EPDM). In an alternative embodiment, coupler 16 may be made of silicone rubber, a plastic material, flourosilicone rubber or any other material having the characteristics of high dielectric strength and strength over a large temperature range. In an exemplary embodiment, the dielectric strength of coupler 16 may be 16 KVolts/millimeter. In alternative embodiments, the dielectric strength may be in the range of 100 V/mm, or lower, up to an unlimited dielectric strength. Coupler 16 couples shaft 12 to shaft 14. When the three sections are coupled together, torque may be transmitted from shaft 12 to shaft 14.

Shaft 12 may have a first opening 18 at one end of shaft 12. Opening 18 may receive an output shaft from a motor as will be explained in more detail below in connection with FIG. 3. Shaft 12 may have a second opening 20 at its other end. In an exemplary embodiment, opening 20 may be formed in a female pattern that may allow it to mate with a corresponding male pattern on coupler 16. An O-ring 13 may be disposed circumferentially around the outside of shaft 12 about midway between openings 18 and 20. In an alternative embodiment, O-ring 13 may be placed at a location other than midway between the openings. The O-ring may be used to prevent contaminates from entering the motor driven rotary actuator. In an exemplary embodiment, opening 20 may be formed in a female cross pattern comprising longitudinal slots (not shown in FIGS. 1 or 2) within the inside surface of shaft 12 adjacent opening 20, as explained in more detail below. The longitudinal slots may be substantially parallel to the longitudinal axis of shaft 12.

As shown in FIGS. 1 and 2, second metallic shaft 14 may be formed in two sections, 22 and 24. Sections 22 and 24 may be formed from a single piece of metal or may be formed of two separate pieces of metal that may be joined together. If the sections are made from two separate pieces of metal, the two pieces may be made from the same kind of metal, in an exemplary embodiment. In an alternative embodiment, the two pieces may be different kinds of metal. The outer surface of section 22 may have an output drive feature or configuration which may enable it to be coupled to a drive shaft. In an exemplary embodiment, the output drive feature may be in the form of splines which enable section 22 to mate with gears, keyways, or another configuration on a drive shaft. In an alternative embodiment, the outer surface of section 22 may be in the form of keyways to enable section 22 to mate with gears, splines, or another configuration on a drive shaft. Section 24 will be described in more detail below. Section 22 may be coupled to a drive shaft for opening and closing a valve.

Figure 5:
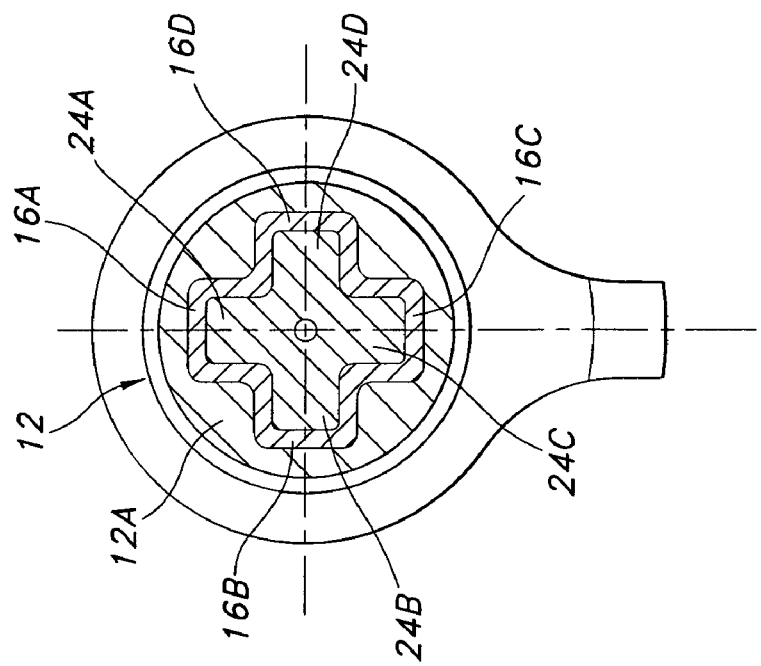
FIG. 5 is a section view of an actuator output shaft according to an exemplary embodiment of the present invention taken across arrows A-A of FIG. 4.
Figure 4:
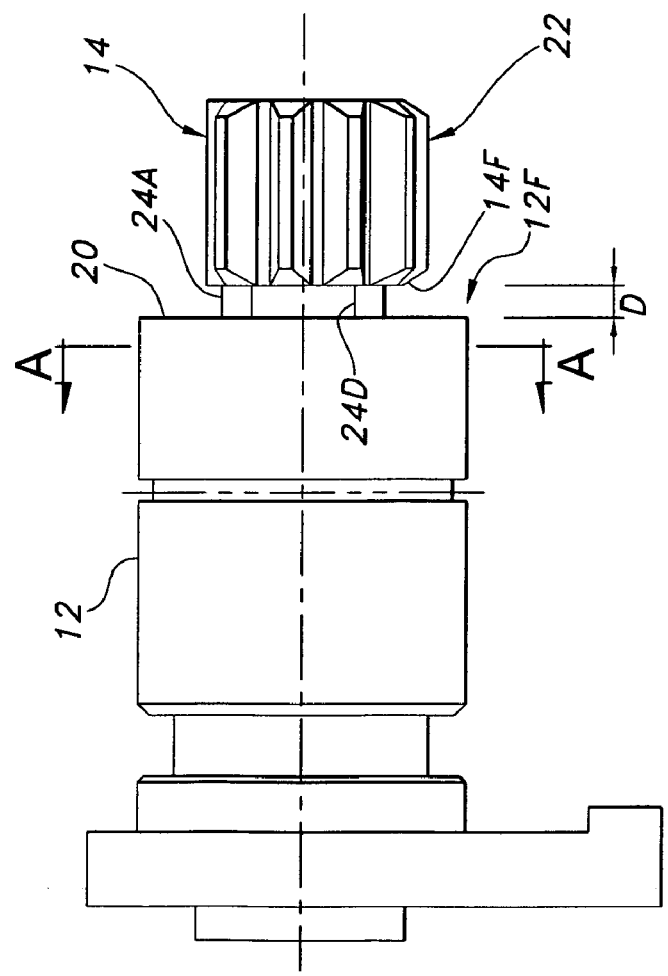
FIG. 4 is a side view of an actuator output shaft according to an exemplary embodiment of the present invention.

FIG. 4 is a side view of an actuator output shaft according to an exemplary embodiment of the present invention. FIG. 5 is a section view of an actuator output shaft according to an exemplary embodiment of the present invention taken across arrows A-A of FIG. 4. FIGS. 1, 2, and 5 show that an exemplary embodiment of coupler 16 has arms 16A, 16B, 16C, and 16D. In the exemplary embodiment, the arms may be formed in the shape of a cross pattern in which the arms are spaced approximately 90° apart from one another. In an alternative embodiment, there may be more or fewer arms, the arms may be spaced at other intervals from one another, and the arms may form a shape other than a cross pattern. In alternative embodiments, the arms may be longer or shorter or more round or less round or any other shape that will enable the shaft assembly to transmit torque. The number of arms may vary so long as the shaft can carry the design torque. In yet another alternative embodiment, a hollow tube may be used instead of arms. The tube may be inserted into a correspondingly shaped opening of metallic shaft 12.

In an exemplary embodiment, the walls of the coupler may be relatively thin, in the range of 0.635 mm to 0.889 mm. The walls may be made thin so that the coupler may not undergo substantial deflection when it transmits torque. In an exemplary embodiment, the amount of deflection of the coupler may be relatively small, in the range of 1 degree to 3 degrees.

In an exemplary embodiment, end face 16E of coupler 16 may be disposed adjacent open end 20. The inside 12A of shaft 12 may be machined in female pattern to match the shapes of arms 16A-16D. In an exemplary embodiment, the female pattern may be in the form of a cross pattern. In an alternative embodiment, the female pattern may form the same shape as arms 16A-16D and the same shape as ribs 24A-24D (described below). When coupler 16 is inserted into shaft 12, each of the male arms may be inserted into a matching internally machined female portion of the inside 12A of shaft 12. Substantially matching the shape of the internally machined portions of shaft 12 to the shapes of arms 16A-16D helps to maximize the amount of torque that may be transferred from shaft 12 to shaft 14. In an alternative embodiment, coupler 16 may be fit into shaft 12 using a press fit or any other fitting mechanism that may allow for transfer of torque. The arms of coupler 16 may also be bonded to the inside 12A of shaft 12. The nature of the bond may depend on the metal used for the shaft and the material used for the coupler. In an exemplary embodiment, the bond may be a silicone chemical bond. In an alternative embodiment, the bond may be accomplished using a material with properties similar to silicone. The bond between arms 16A-16D and the inside 12A of shaft 12 also helps to maximize the amount of torque that may be transferred from shaft 12 to shaft 14. The inside of the coupler, including the inside of each of its arms beginning at end face 16E, may be hollow.

In an exemplary embodiment, the length of arms 16A-16D may be less than half the length of shaft 12. In an alternative embodiment, the length of arms 16A-16D may be greater than half the length of shaft 12. The length of the arms may be determined based upon the amount of torque that needs to be transferred from shaft 12 to shaft 14 and cost considerations. Longer arms may allow a greater amount of torque to be transferred.

An exemplary embodiment of section 24 of shaft 14 may have ribs 24A-24D. In an exemplary embodiment, the ribs 24A-24D may be in the form of a cross pattern in which the ribs are spaced approximately 90° apart from one another. In an alternative embodiment, there may be more or fewer ribs, the ribs may be spaced at other intervals from one another, and the ribs may form a shape other than a cross pattern. In alternative embodiments, the ribs may form the shape of a star or tang or Y-shape or any other shape that will enable transmission of the required torque. The number of ribs may vary so that the part has adequate strength. Also in an exemplary embodiment, the shape and number of ribs 24A-24D may match the shape and number of arms 16A-16D. Coupler 16 may receive section 24 of shaft 14. In an exemplary embodiment, the hollow spaces in arms 16A-16D of coupler 16 may receive ribs 24A-24D of section 24. In yet another alternative embodiment, section 24 may exhibit a round shape and such a round-shaped section 24 may be inserted into a correspondingly shaped coupler.

As shown in FIGS. 2, 4, and 5, shaft 12 may receive coupler 16 at the open end 20 of shaft 12. These figures also show that coupler 16 may receive ribs 24A-24D of shaft 24. The length of ribs 24A-24D may be substantially the same as the length of arms 16A-16D. Substantially matching the shape and length of the ribs 24A-24D to the shape and length of arms 16A-16D helps to maximize the amount of torque that may be transferred from shaft 12 to shaft 14. Ribs 24A-24D may also be bonded to the inside of arms 16A-16D. In an exemplary embodiment, the bond may be a chemical bond using a silicone. In an alternative embodiment, the bond may be accomplished using a material with properties similar to silicone. The bond between ribs 24A-24D and arms 16A-16D also helps to maximize the amount of torque that may be transferred from shaft 12 to shaft 14. Referring to FIG. 4, in an exemplary embodiment there may be a small distance between end 12F of shaft 12 and end 14F of shaft 14 to prevent electrical arcing between first metallic shaft 12 and second metallic shaft 14. When all three elements are coupled together, shaft 12 may be coupled to shaft 14 by coupler section 16. Accordingly, the two metallic shafts 12 and 14 are coupled to one another via the coupler 16.

Coupler 16 may provide substantial electrical isolation between the two metallic shafts 12 and 14, thus substantially electrically isolating a drive shaft and substantially minimizing the amount of electrical energy that may be transmitted to an aircraft fuel system through the drive shaft.

Figure 3:
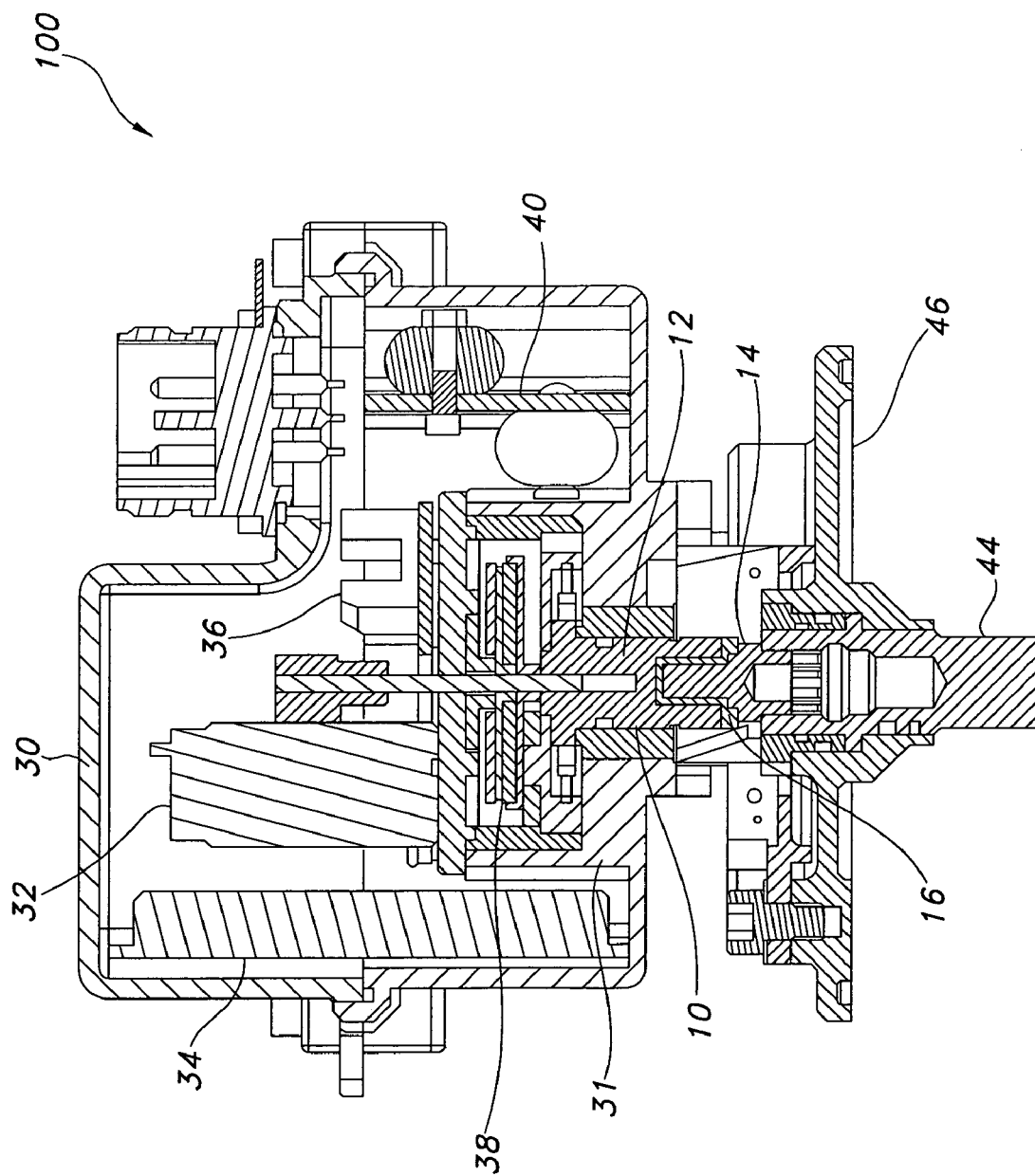
FIG. 3 is a cross-sectional view of a motor driven rotary actuator according to an exemplary embodiment of the present invention.

FIG. 3 is a cross-sectional view of a motor driven rotary actuator 100 according to an exemplary embodiment of the present invention. FIG. 3 shows a cover 30 that encloses an actuator output shaft assembly and other elements that may be used to transmit torque from a motor to a valve via the actuator output shaft assembly. A motor 32 is located within the cover 30. Also within the cover are electronics 34, switches 36, a gear box 38, and Electro Magnetic Interference Suppression Circuit Board 40. In an exemplary embodiment, motor 32 may be a conventional permanent magnet direct current motor that uses brushes. In an alternative embodiment, motor 32 may be any other direct current motor. Motor 32 may also be an alternating current motor.

FIG. 3 also shows actuator output shaft 10 comprising first metallic shaft 12, second metallic shaft 14, nonmetallic, electrically insulating coupler 16, and a housing 31 housing the actuator output shaft 10. A gear box 38 couples the output torque provided by motor 32 to first metallic shaft 12. Electronics 34 may control movement of motor 32 and switches 36 provide feedback to the electronics 34. More specifically, the electronics indicate whether the actuator output shaft is at one of the two ends of its rotational stroke. By doing so, electronics 34 indicate whether the coupled valve (not shown) is open or closed.

The splined output section 14 may be coupled to a drive shaft 44 which may have corresponding gears that allow torque to be transferred from the actuator output shaft 10 to drive shaft 44. The other end of drive shaft 44 may be coupled to a fuel valve (not shown) in a fuel tank (not shown). Accordingly, the output shaft 10 may transmit torque from motor 32 to drive shaft 44 which may open and close the fuel valve inside the fuel tank. In an alternative embodiment, drive shaft 44 may be coupled to a plurality of fuel valves in one or more fuel tanks to open and close one or more of the fuel valves.

A mounting plate 46 may be mounted to an outside wall of a fuel tank to couple actuator 100 to the fuel tank. In an alternative embodiment, mounting plate 46 may be mounted to an inside wall of a fuel tank. Regardless of where mounting plate 46 is mounted, drive shaft 44 may be wet with aviation fuel and the remainder of the actuator output shaft assembly may be exposed to a wide range of ambient temperatures and pressures. The invention may substantially isolate possible electrical energy from being transmitted from the housing to the aircraft fuel system through the drive shaft 44.

Figure 6:
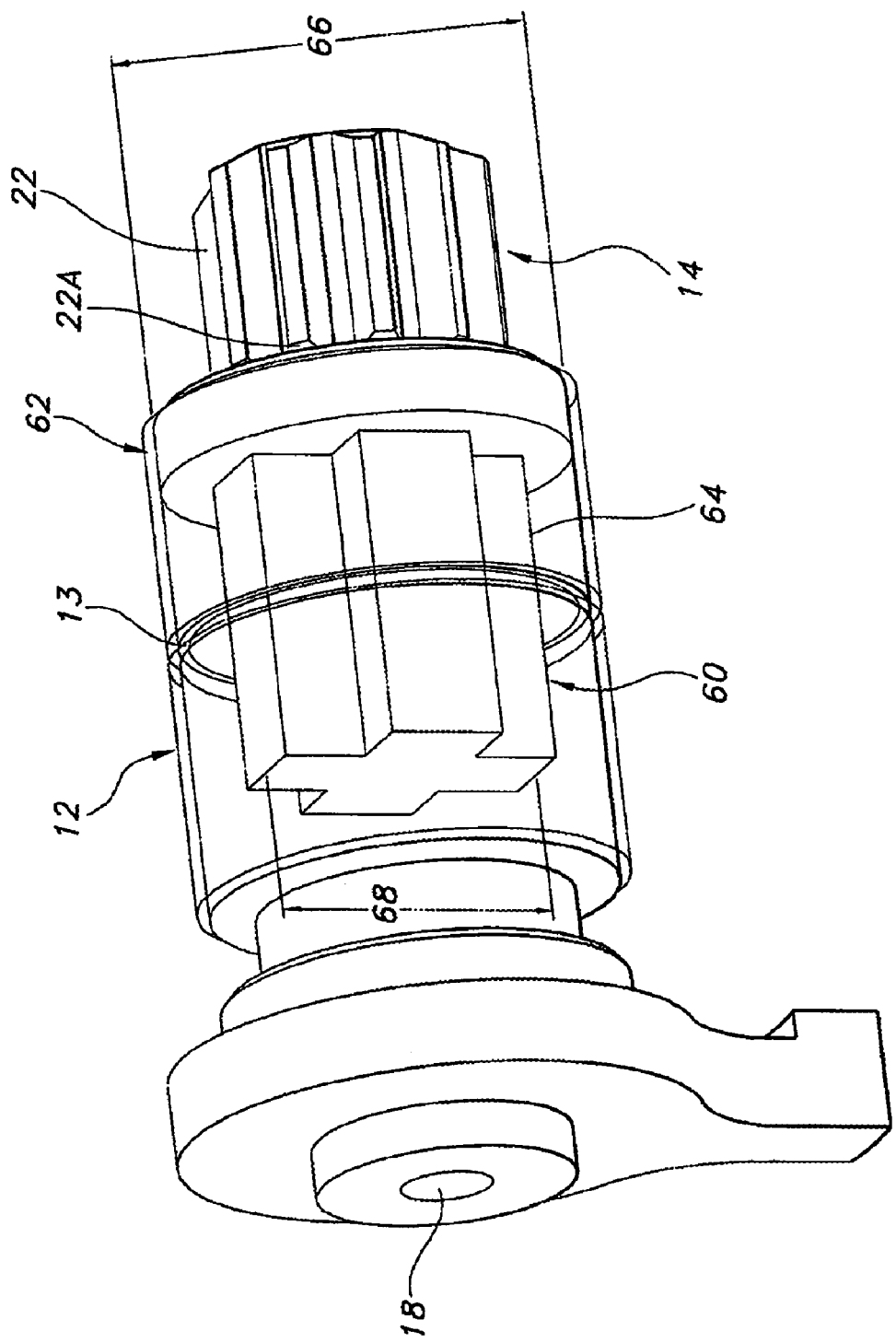
FIG. 6 is a semi-transparent view of an alternative embodiment of an actuator output shaft.
Figure 7:
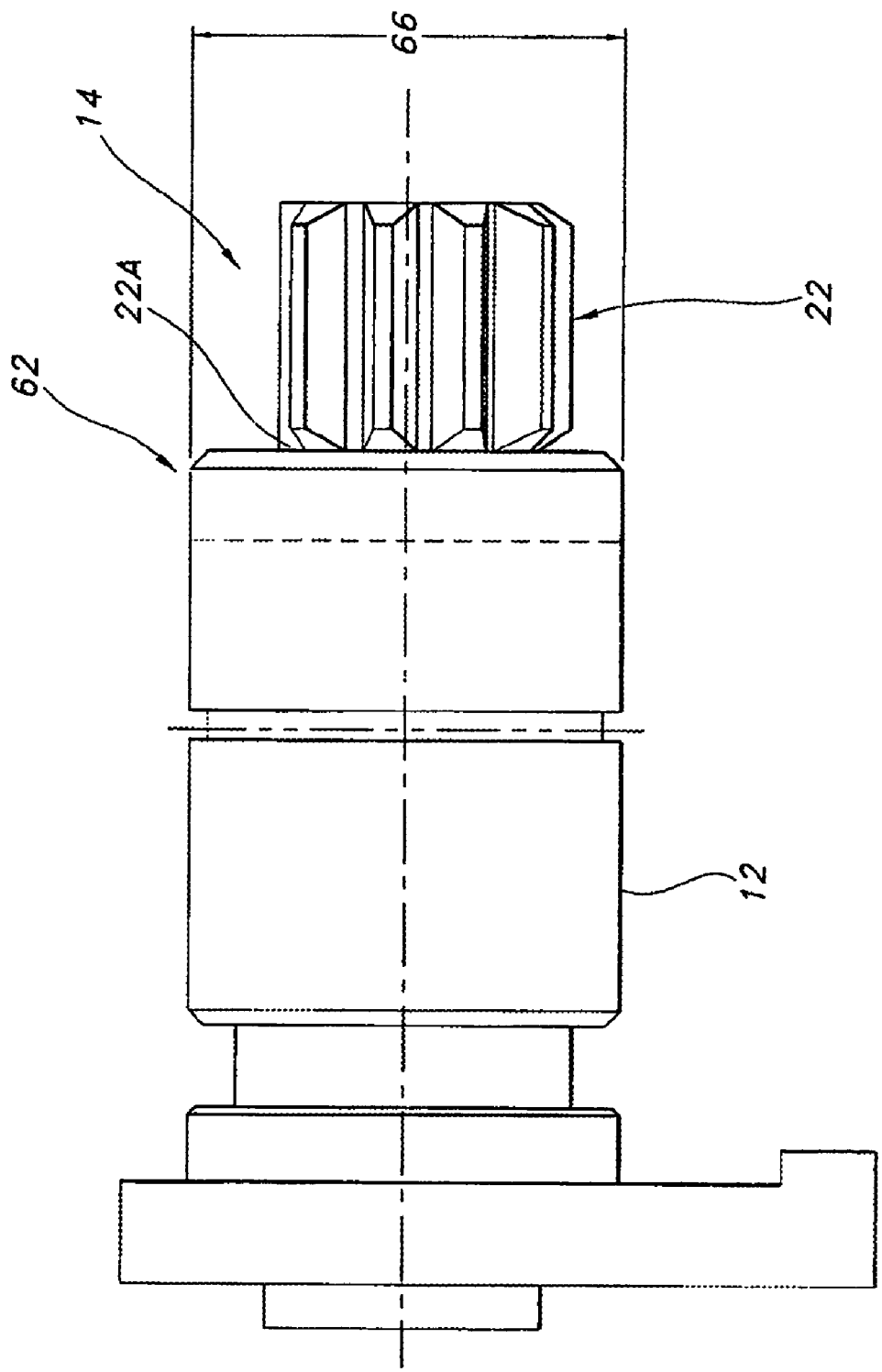
FIG. 7 is a side view of an actuator output shaft according to an alternative embodiment of the present invention.

FIG. 6 is a semi-transparent view of an alternative embodiment of an isolated actuator output shaft showing a first metallic shaft 12, a second metallic shaft 14, and a nonmetallic insulating coupler section 60. FIG. 7 is a side view of an actuator output shaft according to an alternative embodiment of the present invention. Reference number 13 indicates a circumferential area around the outside of first metallic shaft 12 indicating the approximate position of snap ring groove 13. The snap ring groove 13 may be approximately midway between the ends of first metallic section 12. In the embodiment shown in FIG. 6, metallic shaft 12 may be shorter than the length of metallic shaft 12 in the exemplary embodiment. In addition, the length of coupler 60 may be more than one-half the length of the first metallic shaft. For example, the length of the first metallic shaft 12 in the alternative embodiment may be about 24 mm and the length of the coupler 60 may be about 9 mm. In the exemplary embodiment, the ratio of the length of coupler section 60 to the length of metallic shaft 12 may be 8 to 3. The ratio may be increased in order to increase the amount of coupler surface area that contacts the inside of metallic shaft 12, thereby better transmitting torque. The ratio may be lessened if a lesser amount of torque transfer is required or to lower cost. In the alternative embodiment, the ratio may be 4 to 1, or virtually any other ratio which creates coupling of the two shafts to transmit the required torque.

The nonmetallic coupler 60 may comprise two sections. The first section may comprise an annular portion 62 and a second portion 64. Second portion 64 may extend substantially perpendicularly from the annular portion toward opening 18 and substantially parallel to a longitudinal axis of shaft 12. Referring to FIGS. 6 and 7, the diameter 66 of annular portion 62 may be greater than the diameter 68 of second portion 64. In an alternative embodiment, the two diameters may be substantially the same. A portion of annular portion 62 may extend longitudinally beyond second opening 20 of first metallic shaft 12 and may be thick enough to touch end portion 22A of the first section 22 of shaft 14. When annular portion 62 touches second metallic shaft 14, electrical insulation may be provided between the two metallic shafts.

In the alternative embodiment, the inside of metallic shaft 12, portion 22 of metallic second metallic shaft 14, and ribs 24A-D of second section 24 may take substantially the same shapes as the corresponding parts of the exemplary embodiment.

Although the invention is illustrated and described herein with reference to specific embodiments, the invention is not intended to be limited to the details shown. Rather, various modifications may be made in the details within the scope and range of equivalents of the claims and without departing from the invention.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. An actuator for use in a fuel system, said actuator comprising
   a first metallic section having an opening adapted to be coupled to a motor;
   a second metallic section, adapted to be coupled to a valve, partially disposed within the opening of the first metallic section; and
   a nonmetallic section coupled to the first metallic section and the second metallic section for transmitting torque from the first metallic section to the second metallic section, said nonmetallic section comprising
      an annular portion disposed at least partially within the first metallic section and at least partially extending beyond the opening of the first metallic section, and
      a longitudinal portion extending from the annular portion disposed within the first metallic section,
   wherein a diameter of the annular portion is greater than a diameter of the longitudinal portion.

2. The actuator of claim 1, wherein the second metallic section is disposed within the nonmetallic section.

3. The actuator of claim 1, wherein the second metallic section includes at least one rib disposed within the nonmetallic section.

4. The actuator of claim 1, wherein the longitudinal portion extends substantially perpendicularly from the annular portion and substantially parallel to a longitudinal axis of the first metallic section.

5. The actuator of claim 4, wherein the nonmetallic section is an electrical insulator disposed between the first and second metallic sections.

6. The actuator of claim 4, wherein the electrically insulating coupler is bonded to the first metallic section and the second metallic section.

7. The actuator of claim 1, wherein the nonmetallic section is fitted to the first and second metallic sections.

8. The actuator of claim 1, wherein the second metallic section is adapted to be coupled to the valve inside a fuel container.

9. The actuator of claim 1, further comprising a drive shaft adapted to be coupled to the valve, the second metallic section being adapted to be coupled to the valve through the drive shaft.

10. The actuator of claim 9, further comprising a spline on one of the second metallic section and the drive shaft and a keyway on one of the second metallic section and the drive shaft for mating the second metallic section to the drive shaft.

11. The actuator of claim 1, further comprising a drive shaft adapted to be coupled to a plurality of valves, the second metallic section being adapted to be coupled to the plurality of valves through the drive shaft.

12. The actuator of claim 1, wherein the nonmetallic section has an opening for receiving a complementary shaped portion of the second metallic section.

13. The actuator of claim 1, further comprising a motor coupled to the first metallic section for providing torque to the first metallic section and to the second metallic section.

14. The actuator of claim 13, further comprising a drive shaft coupled to the second metallic section for receiving the torque provided to the second metallic section.

15. The actuator of claim 14, further comprising a valve coupled to the drive shaft.

16. An actuator for use in a fuel system, said actuator having an output shaft comprising
    a first metallic shaft having an open end;
    a second metallic shaft being formed with a drive configuration; and
    an electrically insulating coupler disposed between the first metallic shaft and the second metallic shafts,
    wherein the open end of the first metallic shaft receives the electrically insulating coupler, the electrically insulating coupler having a first portion disposed outside the open end of the first metallic shaft and a second portion disposed inside the first metallic shaft extending from the first portion, the electrically insulating coupler being configured to preclude rotation of the second metallic shaft relative to the electrically insulating coupler, and
    wherein the second portion of the electrically insulating coupler includes an annular portion and a longitudinal portion extending from the annular portion substantially parallel to a longitudinal axis of the first metallic shaft, a diameter of the annular portion being greater than a diameter of the longitudinal portion.

17. The actuator of claim 16, wherein the second metallic section is disposed within the insulating coupler.

18. The actuator of claim 16, wherein the second metallic section includes at least one rib disposed within the insulating coupler.

19. The actuator of claim 16, wherein the insulating coupler is fitted to the first and second metallic sections.

20. The actuator of claim 16, wherein the electrically insulating coupler is concurrently bonded to the first metallic section and to the second metallic section.

21. The actuator of claim 16, wherein a first end of the electrically insulating coupler is disposed outside of the first metallic shaft and a second end of the electrically insulating coupler is disposed within the first metallic shaft.

22. The actuator of claim 16, wherein an end face of the insulating coupler has an opening formed therein receiving a complementary shaped end portion of the second metallic shaft, the opening and the end portion being configured to preclude rotation between the insulating coupler and the second metallic shaft.

23. The actuator of claim 16, wherein the insulating coupler is bonded to the first and second metallic shafts.

24. The actuator of claim 16, wherein the second metallic shaft is adapted to be coupled to a valve inside a fuel container.

25. The actuator of claim 24, further comprising a drive shaft adapted to be coupled to a plurality of valves, the second metallic section being adapted to be coupled to the plurality of valves through the drive shaft.

26. The actuator of claim 24, further comprising a drive shaft adapted to be coupled to the valve, the second metallic section being adapted to be coupled to the valve through the drive shaft.

27. An actuator for insulating electrical energy from ignitable vapors in a fuel system, said actuator having an output shaft comprising a first metallic shaft having an open end;

a second metallic shaft formed with a drive configuration; and an electrically insulating coupler comprising one of silicone, ethylene-propylene-diene rubber, silicone rubber, plastic, or flourosilicone rubber disposed between the first metallic shaft and the second metallic shaft, wherein one portion of the electrically insulating coupler is partially disposed outside the open end of the first metallic shaft and a second portion of the electrically insulating coupler is disposed within the first metallic shaft, the electrically insulating coupler being configured to preclude rotation of the second metallic shaft relative to the electrically insulating coupler and wherein a diameter of the one portion is greater than a diameter of the second portion.

28. The actuator of claim 27, wherein the second metallic shaft is disposed within the electrically insulating coupler.

29. The actuator of claim 27, further comprising a motor coupled to the first metallic shaft for providing torque to the first metallic shaft and to the second metallic shaft.

30. The actuator of claim 29, further comprising a drive shaft coupled to the second metallic shaft for receiving the torque provided to the second metallic shaft.

31. The actuator of claim 30, further comprising a valve coupled to the drive shaft.

* * * * *